(12) United States Patent
Nedza (10) Patent No.: US 11,111,676 B2
(45) Date of Patent: Sep. 7, 2021

(54) PREFABRICATED STAIR COMPONENTS AND STAIR TREAD FINISH SYSTEMS AND METHODS OF MAKING AND USING THE SAME

(71) Applicant: Summit Stairs of Atlanta, Inc., Canton, GA (US)

(72) Inventor: Glen A. Nedza, Port St. Joe, FL (US)

(73) Assignee: Summit Stairs of Atlanta, Inc., Canton, GA (US)

( * ) Notice: Subject to any disclaimer, the term of this patent is extended or adjusted under 35 U.S.C. 154(b) by 11 days.

(21) Appl. No.: 16/554,673

(22) Filed: Aug. 29, 2019

(65) Prior Publication Data

US 2020/0131779 A1 Apr. 30, 2020

Related U.S. Application Data

(60) Provisional application No. 62/752,673, filed on Oct. 30, 2018.

(51) Int. Cl.
| | |
|---|---|
| E04F 11/16 | (2006.01) |
| E04F 11/104 | (2006.01) |
| B32B 21/08 | (2006.01) |
| B32B 21/06 | (2006.01) |
| B32B 27/30 | (2006.01) |
| B32B 21/14 | (2006.01) |
| B32B 21/10 | (2006.01) |
| B32B 5/02 | (2006.01) |

(52) U.S. Cl.
CPC .............. *E04F 11/166* (2013.01); *B32B 5/02* (2013.01); *B32B 21/06* (2013.01); *B32B 21/08* (2013.01); *B32B 21/10* (2013.01); *B32B 21/14* (2013.01); *B32B 27/304* (2013.01); *E04F 11/1045* (2013.01); *B32B 2255/08* (2013.01); *B32B 2255/26* (2013.01); *B32B 2419/00* (2013.01)

(58) Field of Classification Search
None
See application file for complete search history.

(56) References Cited

U.S. PATENT DOCUMENTS

| | | | | |
|---|---|---|---|---|
| 4,058,942 A | * | 11/1977 | Naka ................ | E04F 11/163 52/179 |
| 4,060,947 A | * | 12/1977 | Naka ................ | E04F 11/163 52/179 |
| 4,322,927 A | | 4/1982 | Scott | |
| 4,783,939 A | * | 11/1988 | Bergmann ......... | E04F 11/1043 52/182 |
| 4,840,824 A | * | 6/1989 | Davis ................ | A47G 27/06 428/67 |
| 6,067,758 A | * | 5/2000 | Zenkner ............ | E04F 11/175 52/179 |
| 6,076,936 A | * | 6/2000 | George .............. | F21S 8/032 362/146 |
| 6,295,779 B1 | * | 10/2001 | Canfield ............ | E06B 1/32 49/504 |
| 9,399,874 B2 | | 7/2016 | Spielman | |
| 2002/0029532 A1 | * | 3/2002 | Eve .................. | E04F 11/112 52/182 |

(Continued)

*Primary Examiner* — Joshua K Ihezie
(74) *Attorney, Agent, or Firm* — Withers & Keys, LLC (57) ABSTRACT

Prefabricated stair components and stair tread finish systems are disclosed. Methods of making and using prefabricated stair components and stair tread finish systems are also disclosed.

20 Claims, 6 Drawing Sheets

(56) References Cited

U.S. PATENT DOCUMENTS

| | | | |
|---|---|---|---|
| 2002/0189177 A1* | 12/2002 | Eve | E04F 11/1045 52/184 |
| 2006/0003130 A1* | 1/2006 | O'Connor | A47G 27/0287 428/40.1 |
| 2006/0150539 A1* | 7/2006 | Vanhastel | E04F 11/175 52/179 |
| 2009/0145059 A1* | 6/2009 | Kay | E04F 11/166 52/179 |
| 2009/0277104 A1 | 11/2009 | McCool | |
| 2011/0146168 A1* | 6/2011 | Genderen | E04F 11/1045 52/179 |
| 2011/0179729 A1* | 7/2011 | Thompson | E04F 11/1045 52/179 |
| 2011/0252725 A1* | 10/2011 | Giorgio | E04F 11/1045 52/177 |
| 2012/0204502 A1* | 8/2012 | Gardner | E04F 11/163 52/179 |
| 2013/0055666 A1* | 3/2013 | Lopez | E04F 11/175 52/179 |
| 2013/0305635 A1* | 11/2013 | McCool | E04F 11/163 52/179 |
| 2014/0283468 A1* | 9/2014 | Weitzer | E04F 19/00 52/177 |
| 2016/0010338 A1* | 1/2016 | Steijvers | E04F 11/163 52/182 |
| 2018/0305935 A1* | 10/2018 | Halischuk | E04F 11/175 |

* cited by examiner

FIG. 8

PREFABRICATED STAIR COMPONENTS AND STAIR TREAD FINISH SYSTEMS AND METHODS OF MAKING AND USING THE SAME

CROSS-REFERENCE TO RELATED APPLICATIONS

This patent application claims the benefit of priority to U.S. Provisional Patent Application Ser. No. 62/752,673 filed on Oct. 30, 2018 and entitled "PREFABRICATED STAIR COMPONENTS AND STAIR TREAD FINISH SYSTEMS AND METHODS OF MAKING AND USING THE SAME," the subject matter of which is hereby incorporated by reference in its entirety.

FIELD OF THE INVENTION

The present invention relates generally to prefabricated stair components and stair tread finish systems. The present invention further relates to methods of making and using prefabricated stair components and stair tread finish systems.

BACKGROUND OF THE INVENTION

Historically, when designing a prefabricated staircase, the finish material characteristics of the stair system must be engineered into the structure of the staircase at the onset of construction. Due to Building Code constraints, the dimensions, qualities and material characteristics, restrict the options for material selection. Specifically, when the tread is considered. Prior to the introduction of prefabricated stairs, treads were primarily made of oak. Treads were installed by the trim carpenter after completion of sheetrock and well after the roof was installed. Later, carpet began to replace the oak finished tread as an inexpensive alternative to Oak.

The move towards hardwood flooring and away from the use of carpet in US domestic residences over the last 20 years has also been reflected in preference for staircase finishing used in the same homes. In the past, homeowners preferred to use carpeting to cover stairs. Today, hardwood or hardwood effect finishing's have now become very popular in new construction, and a strong after-market demand also exists for stair re-finishing now exists among current homeowners.

Today, prefabricated staircases are installed in new construction prior to the roof, to give construction workers second floor access during construction, and is a quick and inexpensive alternative to the traditional stair construction methods. However, the timing of the installation of the stairs has caused a problem in the industry. The finished material of the prefab staircase must be determined before the house begins construction. If the homeowner wants their staircase to have oak as the tread, then the staircase will be exposed to weather conditions and construction hazards that can damage the staircase and render it unacceptable.

To solve the problem of damage to the stair finishing, there is a demand for a quick and simple-to-install system of staircase hardwood and hardwood effect finishing for new and existing domestic residential construction, that allows the homeowner to specify the finish of the stair tread and risers, but which also ensures that the staircase remains in code compliance, including the first and the last step on the staircase, and ensures that this final decision is made by the owner and installed once the contract for the house has been signed, rather than being selected by the builder.

SUMMARY OF THE INVENTION

The present invention is directed to new prefabricated stair components and stair tread finish systems that enable quick covering of stairs and stair components. The disclosed prefabricated stair and stair tread finish systems provide an aesthetically pleasing look, as well as protection from wear via a quick installation process.

In some embodiments of the present invention, the prefabricated stair components of the present invention comprise a composite stair component, the composite stair component comprising: a decorative finish layer comprising wood, textured or non-textured paper, a veneer layer, or any combination thereof a support layer comprising wood, medium density fiberboard (MDF), polyvinyl chloride (PVC), a polymeric material, a composite material, or any combination thereof; and a hinge layer positioned between the decorative finish layer and the support layer, the hinge layer comprising a film layer, a fiber-containing layer, a fabric layer, or any combination thereof. In some embodiments, the composite stair component further comprises a protective surface wear layer over the decorative finish layer, the protective surface wear layer comprising at least one resin or polymeric material.

In some embodiments of the present invention, the prefabricated stair components of the present invention comprise a composite stair component, the composite stair component comprising: a decorative finish layer comprising wood, textured or non-textured paper, a veneer layer, or any combination thereof and a support layer comprising wood, medium density fiberboard (MDF), polyvinyl chloride (PVC), a polymeric material, a composite material, or any combination thereof; and a composite profile such that the support layer comprises a molded support layer having an upper support layer surface, a lower support layer surface, and an inner support layer edge surface, at least a portion of the inner support layer edge surface being substantially perpendicular to the lower support layer surface. The composite profile may further comprise an adhesive layer between the decorative layer and the support layer; a protective surface wear layer over the decorative finish layer, the protective surface wear layer comprising at least one resin or polymeric material; or both the adhesive layer and the protective surface wear layer.

The present invention is further directed to methods of making prefabricated stair components and stair tread finish systems. In some embodiments, the method of making a prefabricated stair and stair tread finish systems comprises forming a composite stair component comprising: a decorative finish layer comprising wood, textured or non-textured paper, a veneer layer, or any combination thereof a support layer comprising wood, medium density fiberboard (MDF), polyvinyl chloride (PVC), a polymeric material, a composite material, or any combination thereof; and a hinge layer positioned between the decorative finish layer and the support layer, the hinge layer comprising a film layer, a fiber-containing layer, a fabric layer, or any combination thereof. The method of forming the composite stair component may comprise one or more laminating steps, as well as additional steps discussed below.

In other embodiments, the method of making a prefabricated stair and stair tread finish systems comprises assembling (i) a decorative finish layer comprising, for example, wood, textured or non-textured paper, a veneer layer, or any combination thereof and (ii) a support layer comprising, for example, wood, medium density fiberboard (MDF), polyvinyl chloride (PVC), a polymeric material, a composite material, or any combination thereof, with one another, and molding the decorative finish layer and the support layer.

The present invention is even further directed to methods of using prefabricated stair components and stair tread finish systems. In some embodiments, the method of using a prefabricated stair and stair tread finish system comprises covering at least a portion of a stair with a composite stair component comprising: a decorative finish layer comprising wood, textured or non-textured paper, a veneer layer, or any combination thereof; a support layer comprising wood, medium density fiberboard (MDF), polyvinyl chloride (PVC), a polymeric material, a composite material, or any combination thereof; and a hinge layer positioned between the decorative finish layer and the support layer, the hinge layer comprising a film layer, a fiber-containing layer, a fabric layer, or any combination thereof.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein.

DETAILED DESCRIPTION OF THE INVENTION

The present invention is directed to prefabricated stair components and stair tread finish systems. The present invention is further directed to methods of making and using prefabricated stair components and stair tread finish systems.

I. Prefabricated Stair Components and Stair Tread Finish Systems

Figure 1:
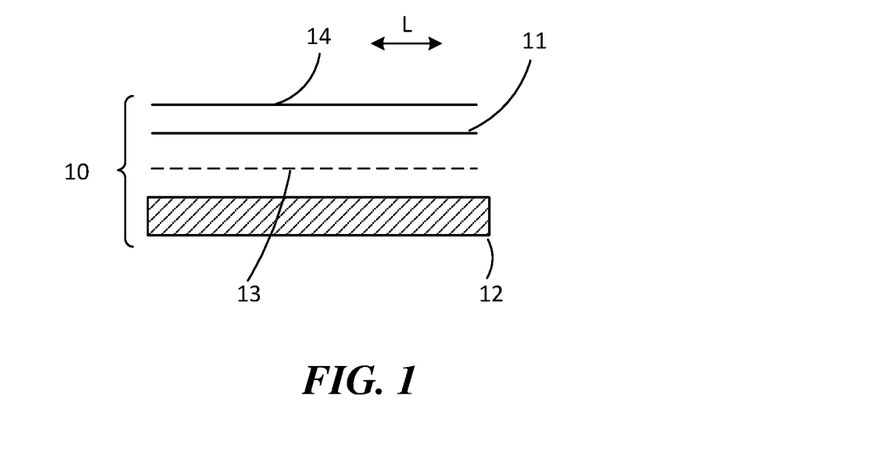
FIG. 1 depicts an exemplary composite stair component of the present invention.

The present invention is directed to prefabricated stair components 10 and stair tread finish systems 20. In some embodiments, the prefabricated stair components 10 and stair tread finish systems 20 of the present invention comprise a composite stair component 10 comprising up to four layers as shown in FIG. 1: (1) an optional wear surface layer 14 comprising at least one polymeric material (desirably, an optically clear (e.g., transparent or translucent) plastic-type protectant, e.g., a polyurethane); (2) a finish layer 11 comprising wood, textured or non-textured paper, a veneer layer, or any combination thereof; (3) a hinging layer 13 comprising a textile fabric (e.g., a nonwoven or other fabric layer); and (4) a support layer 12 comprising wood, medium density fiberboard (MDF), polyvinyl chloride (PVC), or any combination thereof.

Figure 2:
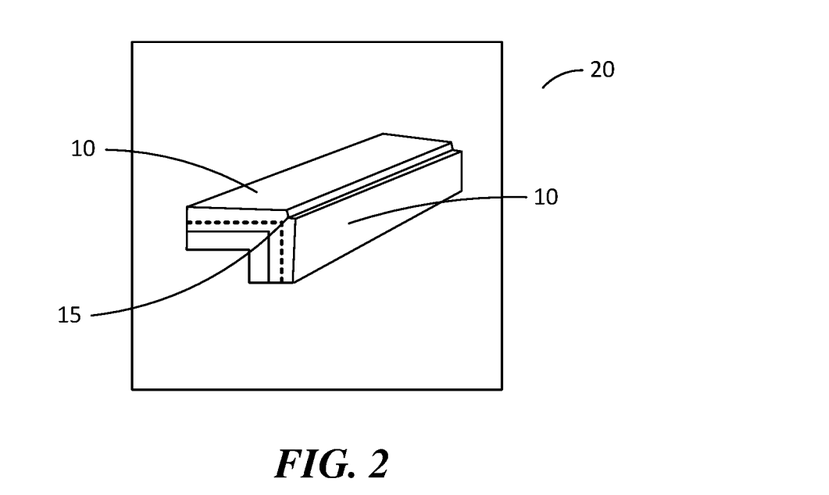
FIG. 2 depicts an exemplary composite stair component system using two exemplary composite stair components shown in FIG. 1.
Figure 3A:
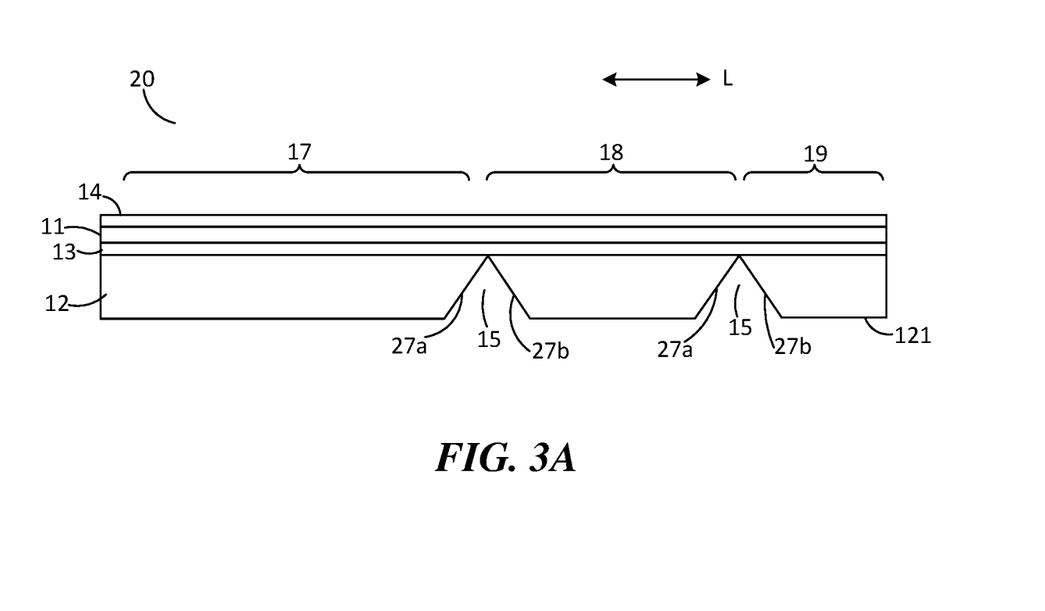
FIGS. 3A-3B depict an exemplary stair tread finish system using the exemplary composite stair component shown in FIG. 1, miter cut in two locations.
Figure 3B:
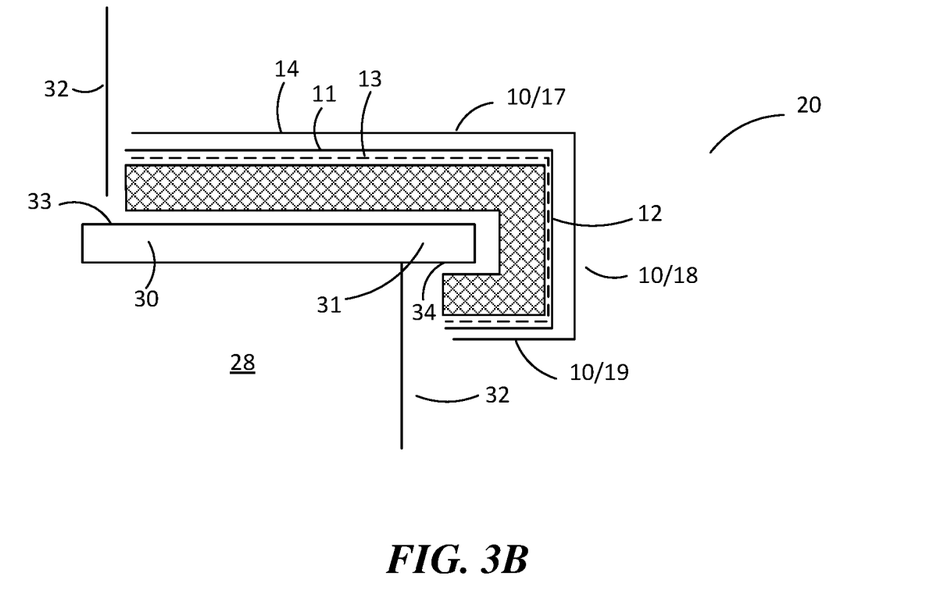

As shown in FIG. 2, the prefabricated stair component 10 is capable of being miter-cut, as illustrated, to create a simple stair tread finish system 20, which covers the tread 30 of stairs 28 and can be installed so as to surround the nose 31 of the stairs 28 and ensure that the staircase 28 remains within code. FIG. 3 illustrates one way in which the prefabricated stair component 10 and stair tread finish systems 20 of the present invention could be applied.

As shown in FIGS. 1-3B, the prefabricated stair component 10 may comprise four layers, each layer providing features as discussed herein. As shown in FIGS. 3A-3B, an exemplary stair tread finish system 20 of the present invention comprises three outer layer components designed to be conformed around a stair 28: (1) a tread component 17 applied to the horizontal surface 33 of the tread 30 of stair 28, (2) a vertical nose 'facing' component 18 applied to the vertical section of the nose 31, and (3) an 'under-nose' facing component 19 applied horizontally to the bottom section of the nose 31.

Figure 4:
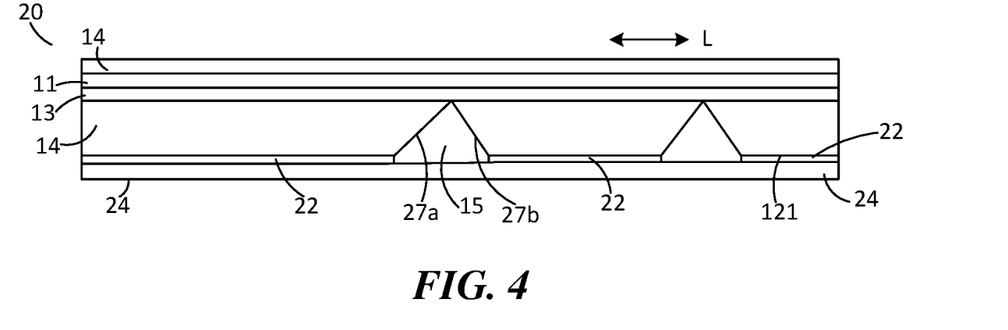
FIG. 4 depicts the exemplary stair tread finish system shown in FIG. 3A with optional attachment system layer and backing layer.

As shown in FIG. 4, an exemplary stair tread finish system 20 of the present invention may further comprise an optional attachment system 22 and an optional backing layer 24. Optional attachment system 22 may comprise, for example, a pressure sensitive adhesive suitable for bonding exemplary stair tread finish system 20 to stair 28 as discussed above. Optional backing layer 24 may comprise a removable sheet material (e.g., a paper layer, a film layer, a fiber-reinforced film layer, a scrim layer, etc.) that provides temporary protection to attachment system 22 (e.g., a release liner backing layer). Alternatively, optional attachment system 22 and optional backing layer 24 may be replaced with a single backing layer 24 (e.g., a paper layer, a film layer, a fiber-reinforced film layer, a scrim layer, etc.) that remains on exemplary stair tread finish system 20 during and after installation of exemplary stair tread finish system 20 onto a stair 28.

As shown in FIGS. 2-4, exemplary stair tread finish system 20 can be mitered at a 45 degree angle (or a V-groove) through support material 12, with a contiguous edge (e.g., formed by decorative layer 11 and wear layer 14) to facilitate forming a 90 degree turn between components 17 and 18, as well as between components 18 and 19 to facilitate easy folding of exemplary stair tread finish system 20 which, importantly, will also remain in full alignment during installation.

The miter cut 15 may be a simple "V" shaped groove, or it could be in the form of a complex shape. See, for example, exemplary miter cuts 15 shown in FIGS. 5A-5C. The shape of the bottom of the miter cut 15 could include a truncated "v" shape (see FIG. 5B), or a small circle (see FIG. 5C) or what is akin to almost the negative shape of a chamfer at the bottom.

Figure 5A:
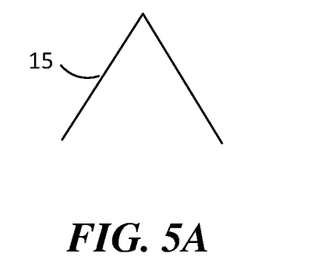
FIGS. 5A-5C depict exemplary miter cut shapes that could be used in the exemplary stair tread finish system shown in FIGS. 3A-3B.
Figure 5B:
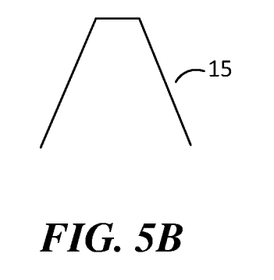
Figure 5C:
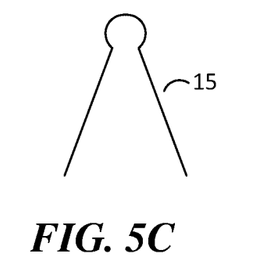

Some shapes may work better in construction environments, as they are more forgiving of ingress of sawdust or other materials into the hinge mitered area 15. Such particulate contamination may distort the fold, thereby adding more stress to the external decorative and protective surface 11/14 on the outside of the hinge 13.

Another possible feature is one in which the two surfaces 27a and 27b, which come together in the hinge (see, FIG. 3A), snap or attach in some other way together (e.g., hook and loop material, adhesive, etc.) locking the hinge in place, further stabilizing and securing the components 17/18/19 of the folded exemplary stair tread finish system 20. Other similar interlocking shapes (i.e., along each of the two surfaces 27a and 27b) can be considered that might be easier to cut and manufacture.

Figure 6A:
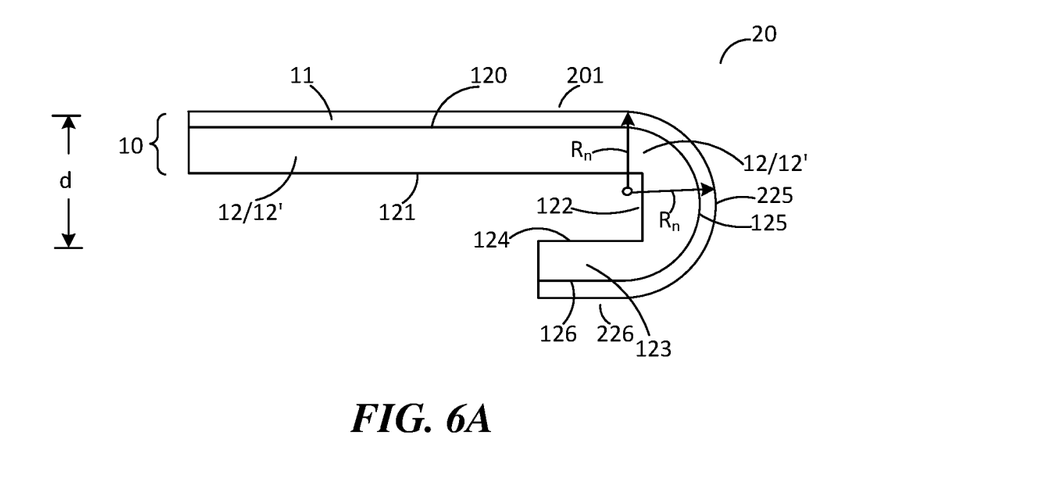
FIGS. 6A-6B depict additional exemplary composite stair components of the present invention.
Figure 6B:
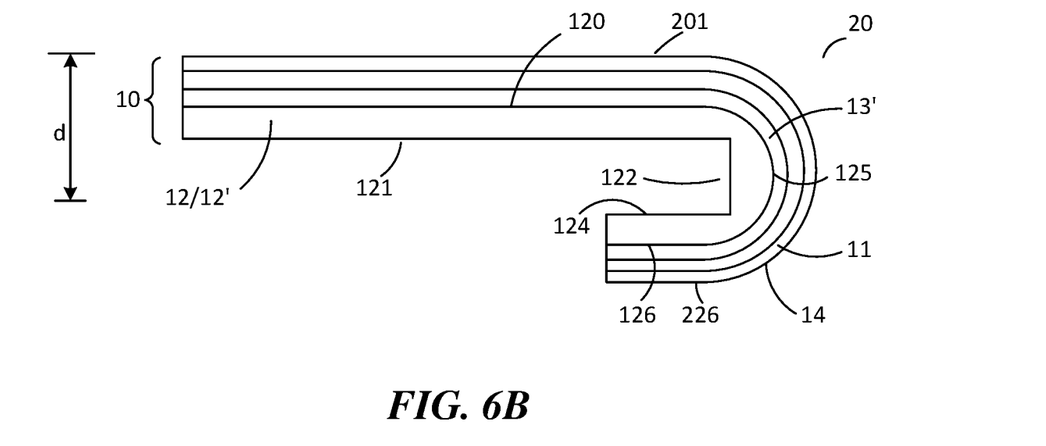

In other embodiments, the prefabricated stair components 10 and stair tread finish systems 20 of the present invention comprise a composite stair component 10 comprising two or more layers as shown in FIGS. 6A-6B: (1) an optional wear surface layer 14 comprising at least one polymeric material (desirably, an optically clear (e.g., transparent or translucent) plastic-type protectant, e.g., a polyurethane); (2) a finish layer 11 comprising, for example, wood, textured or non-textured paper, a veneer layer, or any combination thereof; (3) an optional adhesive layer 13' comprising a liquid or solid adhesive (e.g., a thermoplastic film that, when heated, provides adhesive properties); and (4) a molded support layer 12' comprising, for example, wood, medium density fiberboard (MDF), polyvinyl chloride (PVC), or any combination thereof.

More details of suitable materials for each layer within the composite stair component 10 are provided below:

Protective Surface Wear Layer

The optional, desirably clear (e.g., transparent) protective layer 14 may be a resinous type material, such as an epoxy, or polyurethane, or melamine formaldehyde or methylol-melamine resin, or it could be a curing cross-linking varnish overcoat, or it could be a UV-curable acrylate type material. The protective layer 14 desirably has enough flexibility to be able to be bent (i.e., 90°) at the point of the hinge, yet be durable enough to withstand wear under foot.

Decorative Layer

The decorative layer 11 may be a layer of laminate flooring, which simulates wood (or sometimes stone) with a photographic applique layer under a clear protective layer. The decorative layer 11 may be formed from layers of printed paper, which have been impregnated with a resin such as a urea formaldehyde, melamine formaldehyde, methylol-melamine, epoxy or similar resin, and cured to form a solid decorative composite.

Alternatively, the decorative layer may comprise a stack of paper in a composite with numerous similar wood-grain effect impressions, and be strong and durable enough that the material does not need a wear-resistant over coating 14.

Hinge Layer

A material with a flexible, durable hinge. This material may be a textile, nonwoven or an open scrim material, or a hinge polymer material continuous sheet, or an array of aligned fibers (e.g. glass or a ceramic) bonded to the laminate surface layer, or an adhesive layer with or without fiber reinforcement. The hinge layer 13 (also referred to as a "tie layer") is designed to hold the components and materials in place and allow them to (i) fold through 90-degrees during the process of attachment installation in some embodiments or (ii) be molded and bent during a molding process in other embodiments. It is not entirely necessary for the hinge layer 13 to be present for the entire length and width of the composite stair component 10, however, it may be desirable.

The hinge material 13 could include numerous polymers and polymer types (e.g., thermoplastic polymers). Poly (ethylene terephthalate) or PET forms a useful and durable hinge, as do nylons, poly (olefins) such as polypropylene and polyethylene, poly (acrylonitrile). Crosslinking adhesive systems (e.g., acrylics, methacrylics, epoxies, etc.) may also be used as the hinge material 13.

In some embodiments, the hinge layer 13 comprises a hinge polymer material continuous sheet formed from a thermoplastic material that acts as an adhesive layer when heated. See, for example, exemplary composite stair component 10 shown in FIG. 6B.

Support/Stabilization Layer

The support/stabilization layer 12 may be a polyvinyl chloride (PVC) material or a composite of melamine resin and fiber board or other high density fiber board. Other materials may be used including, but not limited to, wood, various polymers, polyethylene, high density polyethylene, polypropylene, polybutylene, polyester, polyamide, and other materials generally described as thermoplastic polymer materials and thermoplastic resins.

In some embodiments, the support/stabilization layer 12 comprises any one or combination of the above-mentioned materials formed into a molded support layer 12' having an upper support layer surface 120, a lower support layer surface 121, and an inner support layer edge surface 122, at least a portion of the inner support layer edge surface 122 being substantially perpendicular to the lower support layer surface 121. See, for example, exemplary composite stair component 10 shown in FIGS. 6A-6B and 8.

II. Methods of Making Prefabricated Stair Components and Stair Tread Finish Systems The present invention is also directed to methods of making prefabricated stair components 10 and stair tread finish systems 20. Composite stair component 10 may be made using conventional laminating techniques. For example, each of layers 11 to 14 may be formed separately, and then combined during a laminating step. Alternatively, each layer 11 to 14 may be formed on a previously provided layer (e.g., hinge layer 13 is attached to support layer 12, then decorative layer 11 is formed on hinge layer 13, etc.).

Figure 7A:
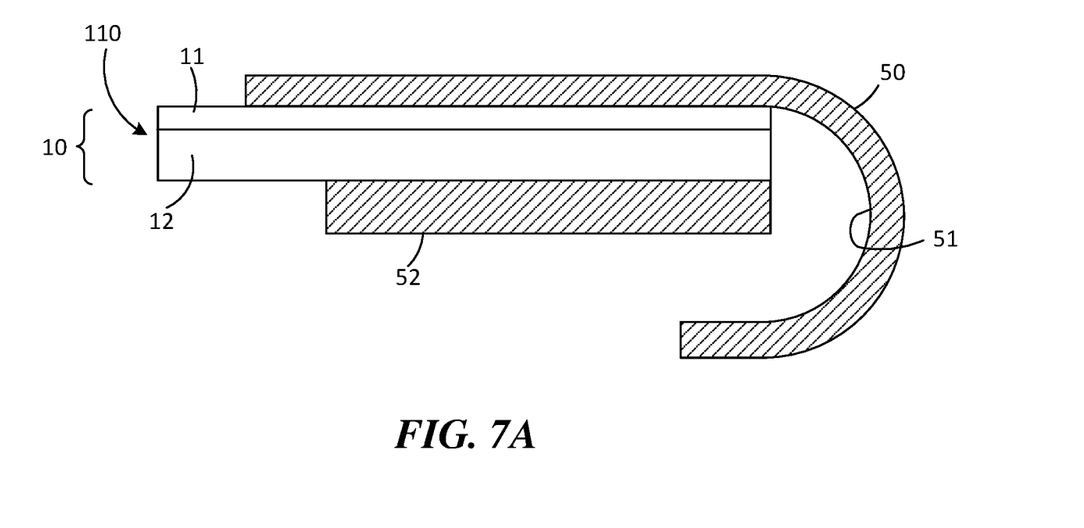
FIGS. 7A-7B depict process steps for forming either of the exemplary composite stair components shown in FIGS. 6A-6B.
Figure 7B:
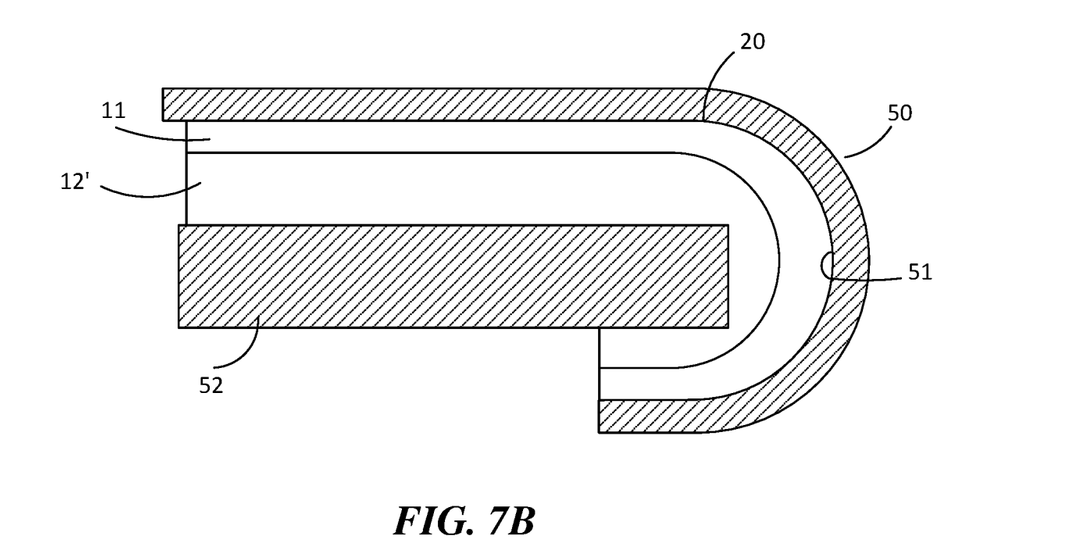

In some embodiments, two or more of layers 11 to 14 may be assembled with one another and subsequently molded to form a composite stair component 10 having a molded support layer 12' as shown in FIGS. 7A-7B.

Once formed, the stair tread finishing system 20 may be attached to pre-fabricated stairs 28 using any one of the following attachment systems:

Liquid adhesive (e.g., PVC Compound)

Pressure sensitive adhesive, coated onto the underside of the cover, and protected by siliconized removable paper, Industrial strength double-sided tape (e.g., VHB-tape 3M (VHB=Very High Bond))

Industrial Hook and Loop

Countersunk Screws

Other attachment system.

III. Methods of Using Prefabricated Stair and Stair Tread Finish Systems

Figure 8:
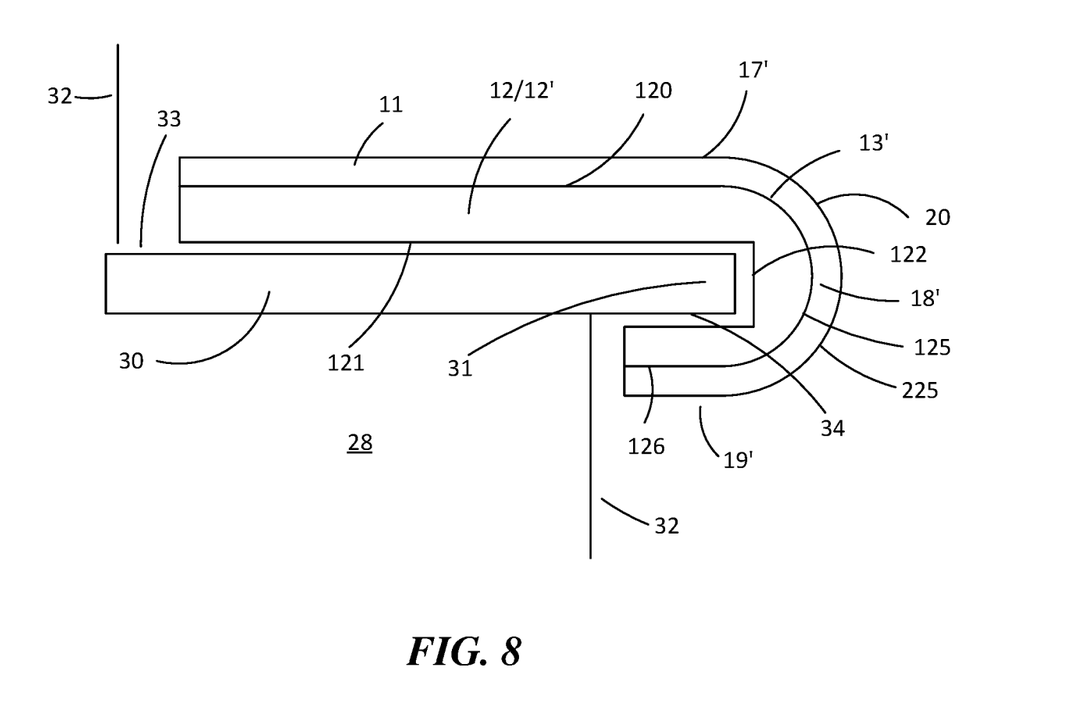
FIG. 8 depicts an exemplary stair tread finish system using the exemplary composite stair component shown in FIG. 6A.

The present invention is also directed to methods of using prefabricated stair components 10 and stair tread finish systems 20. As shown in FIGS. 3A-3B and 8, methods of using the prefabricated stair components 10 and stair tread finish systems 20 of the present invention include covering at least a portion of a stair 28 with the prefabricated stair component 10 and/or stair tread finish system 20.

The present invention will be further described in the following additional embodiments, examples, and claims.

Additional Embodiments

Prefabricated Composite Stair Components

1. A composite stair component 10 comprising: a decorative finish layer 11 comprising wood, textured or non-textured paper, a veneer layer, or any combination thereof; a support layer 12 comprising wood, medium density fiberboard (MDF), polyvinyl chloride (PVC), a polymeric material, a composite material, or any combination thereof; and at least one of: a hinge layer 13 positioned between said decorative finish layer 11 and said support layer 12, said hinge layer 13 comprising a film layer, a fiber-containing layer, a fabric layer, or any combination thereof; and a composite profile such that the support layer 12 comprises a molded support layer 12' having an upper support layer surface 120, a lower support layer surface 121, and an inner support layer edge surface 122, at least a portion of the inner support layer edge surface 122 being substantially perpendicular to the lower support layer surface 121.
2. The composite stair component 10 of embodiment 1, wherein the support layer 12/12' comprises wood.
3. The composite stair component 10 of embodiment 1 or 2, wherein the support layer 12/12' comprises medium density fiberboard (MDF).
4. The composite stair component 10 of any one of embodiments 1 to 3, wherein the support layer 12/12' comprises polyvinyl chloride (PVC).
5. The composite stair component 10 of any one of embodiments 1 to 4, wherein the support layer 12/12' comprises a composite material comprising melamine resin and fiber board or other high density fiber board.
6. The composite stair component 10 of any one of embodiments 1 to 5, wherein the decorative finish layer 11 comprises wood.
7. The composite stair component 10 of any one of embodiments 1 to 6, wherein the decorative finish layer 11 comprises textured paper.
8. The composite stair component 10 of any one of embodiments 1 to 7, wherein the decorative finish layer 11 comprises non-textured paper.
9. The composite stair component 10 of any one of embodiments 1 to 8, wherein the decorative finish layer 11 comprises a veneer layer.
10. The composite stair component 10 of any one of embodiments 1 to 9, wherein the decorative finish layer 11 further comprises a resin that coats, impregnates and/or encompasses the wood, the textured or non-textured paper, and/or the veneer layer.
11. The composite stair component 10 of any one of embodiments 1 to 10, wherein the hinge layer 13 is present and comprises a film layer.
12. The composite stair component 10 of any one of embodiments 1 to 11, wherein the hinge layer 13 is present and comprises a fiber-containing layer.
13. The composite stair component 10 of embodiment 12, wherein the fiber-containing layer comprises at least one layer of unidirectional fibers extending in a length direction L.
14. The composite stair component 10 of any one of embodiments 1 to 13, wherein the hinge layer 13 is present and comprises a fabric layer.
15. The composite stair component 10 of embodiment 14, wherein the fabric layer comprises a woven fabric, a nonwoven fabric, a knit fabric, or any combination thereof.
16. The composite stair component 10 of any one of embodiments 1 to 15, wherein the composite stair component 10 comprises the composite profile.
17. The composite stair component 10 of any one of embodiments 1 to 16, wherein the molded support layer 12' further comprises a lower support layer portion 123 extending (i) substantially perpendicular to the inner support layer edge surface 122 and (ii) substantially parallel with and below the lower support layer surface 121. See, for example, FIG. 6A-6B.
18. The composite stair component 10 of embodiment 17, wherein the lower support layer portion 123 comprises an upper inner support layer surface 124 below the lower support layer surface 121, and the upper inner support layer surface 124 is a distance d from an upper composite profile surface 201. See, for example, FIG. 6A-6B.
19. The composite stair component 10 of embodiment 18, wherein distance d is less than or equal to 1.0 inch (in.).
20. The composite stair component 10 of any one of embodiments 1 to 19, wherein the molded support layer 12' further comprises an outer support layer front edge surface 125, wherein (i) the outer support layer front edge surface 125 extends from and is connect to the upper support layer surface 120, and (ii) at least a portion of the outer support layer edge surface 125 extends below the lower support layer surface 121. See, for example, FIG. 6A-6B.
21. The composite stair component 10 of embodiment 20, wherein the upper support layer surface 120 and the outer support layer front edge surface 125 form a first curved surface profile.
22. The composite stair component 10 of embodiment 20 or 21, wherein the molded support layer 12' further comprises an outer lowermost support layer edge surface 126, wherein (i) the outer lowermost support layer edge surface 126 extends from and is connected to the outer support layer front edge surface 125, and (ii) at least a portion of the outer lowermost support layer edge surface 126 extends below the upper inner support layer surface 124. See, for example, FIG. 6A-6B.
23. The composite stair component 10 of embodiment 22, wherein the upper support layer surface 120 and the outer support layer front edge surface 125 and the outer lowermost support layer edge surface 126 form a second curved surface profile.
24. The composite stair component 10 of any one of embodiments 1 to 23, wherein the composite stair component 10 comprises an upper composite profile surface 201 and an outer composite profile front edge surface 225, and (i) the outer composite profile front edge surface 225 extends from and is connect to the upper composite profile surface 201, and (ii) at least a portion of the outer composite profile edge surface 225 extends below the lower support layer surface 121. See, for example, FIGS. 6A-6B.
25. The composite stair component 10 of embodiment 24, wherein the upper composite profile surface 201 and the outer composite profile front edge surface 225 form a third curved surface profile having a nose radius $R_n$. See, for example, FIG. 6A.
26. The composite stair component 10 of embodiment 25, wherein the nose radius $R_n$ is less than or equal to 0.5 in.
27. The composite stair component 10 of any one of embodiments 24 to 26, wherein the composite stair component 10 further comprises an outer lowermost composite profile edge surface 226, wherein (i) the outer lowermost composite profile edge surface 226 extends from and is connected to the outer composite profile front edge surface 225, and (ii) at least a portion of the outer lowermost composite profile edge surface 226 extends below the upper inner support layer surface 124. See, for example, FIG. 6A.

28. The composite stair component 10 of embodiment 27, wherein the upper composite profile surface 201 and the outer composite profile front edge surface 225 and the outer lowermost composite profile edge surface 226 form a fourth curved surface profile.

29. The composite stair component 10 of embodiment 27 or 28, wherein the decorative finish layer 11 extends along the upper composite profile surface 201, the outer composite profile front edge surface 225, and the outer lowermost composite profile edge surface 226.

30. The composite stair component 10 of any one of embodiments 24 to 28, wherein the decorative finish layer 11 extends along the upper composite profile surface 201 and the outer composite profile front edge surface 225.

31. The composite stair component 10 of any one of embodiments 1 to 30, further comprising an adhesive layer 13' positioned between the decorative finish layer 11 and the molded support layer 12'.

32. The composite stair component 10 of embodiment 31, wherein the adhesive layer 13' comprises a thermoplastic polymer adhesive or a crosslinking adhesive.

33. The composite stair component 10 of any one of embodiments 1 to 32, further comprising: a protective surface wear layer 14 over said decorative finish layer 11, said protective surface wear layer 14 comprising at least one resin or polymeric material.

34. The composite stair component 10 of embodiment 33, wherein the protective surface wear layer 14 comprises an optically clear (e.g., transparent) resin or polymeric material.

35. The composite stair component 10 of embodiment 33 or 34, wherein the protective surface wear layer 14 comprises an epoxy resin.

36. The composite stair component 10 of embodiment 33 or 34, wherein the protective surface wear layer 14 comprises a polyurethane.

37. The composite stair component 10 of embodiment 33 or 34, wherein the protective surface wear layer 14 comprises an acrylate or acrylic resin or polymer.

38. The composite stair component 10 of any one of embodiments 1 to 37, wherein each of (i) the decorative layer 11, (ii) the support layer 12, (iii) the hinge layer 13, (iv) the molded support layer 12', (v) the adhesive layer 13', and (vi) the optional protective wear layer 14, when present, independently has a layer thickness of from about 0.5 millimeters (mm) to about 40 mm (or any value between 0.5 mm and 40 mm, including 0.5 mm and 40 mm, in increments of 0.1 mm, for example, 2.5 mm, or any range of values between 0.5 mm and 40 mm, including 0.5 mm and 40 mm, in increments of 0.1 mm, for example, from about 2.1 mm to about 2.8 mm).

39. The composite stair component 10 of any one of embodiments 1 to 38, wherein when present, (i) the decorative layer 11 has a layer thickness of from about 0.5 mm to about 5.0 mm (or any value between 0.5 mm and 5.0 mm, including 0.5 mm and 5.0 mm, in increments of 0.1 mm, for example, 1.2 mm, or any range of values between 0.5 mm and 5.0 mm, including 0.5 mm and 5.0 mm, in increments of 0.1 mm, for example, from about 0.8 mm to about 1.8 mm), (ii) the support layer 12 has a layer thickness of from about 5.0 mm to about 25.0 mm (or any value between 5.0 mm to about 25.0 mm, including 5.0 mm to about 25.0 mm, in increments of 0.1 mm, for example, 10.2 mm, or any range of values between 5.0 mm to about 25.0, including 5.0 mm to about 25.0 mm, in increments of 0.1 mm, for example, from about 15.2 mm to about 21.8 mm), (iii) the hinge layer 13 has a layer thickness of from about 0.5 mm to about 5.0 mm (or any value between 0.5 mm and 5.0 mm, including 0.5 mm and 5.0 mm, in increments of 0.1 mm, for example, 2.2 mm, or any range of values between 0.5 mm and 5.0 mm, including 0.5 mm and 5.0 mm, in increments of 0.1 mm, for example, from about 1.8 mm to about 2.5 mm), (iv) the molded support layer 12' has a layer thickness of from about 5.0 mm to about 25.0 mm (or any value between 5.0 mm to about 25.0 mm, including 5.0 mm to about 25.0 mm, in increments of 0.1 mm, for example, 10.2 mm, or any range of values between 5.0 mm to about 25.0, including 5.0 mm to about 25.0 mm, in increments of 0.1 mm, for example, from about 15.2 mm to about 21.8 mm), (v) the adhesive layer 13' has a layer thickness of from about 0.5 mm to about 5.0 mm (or any value between 0.5 mm and 5.0 mm, including 0.5 mm and 5.0 mm, in increments of 0.1 mm, for example, 2.2 mm, or any range of values between 0.5 mm and 5.0 mm, including 0.5 mm and 5.0 mm, in increments of 0.1 mm, for example, from about 1.8 mm to about 2.5 mm), and (vi) optional protective wear layer 14 has a layer thickness of from about 0.5 mm to about 5.0 mm (or any value between 0.5 mm and 5.0 mm, including 0.5 mm and 5.0 mm, in increments of 0.1 mm, for example, 1.2 mm, or any range of values between 0.5 mm and 5.0 mm, including 0.5 mm and 5.0 mm, in increments of 0.1 mm, for example, from about 0.8 mm to about 1.8 mm).

40. The composite stair component 10 of any one of embodiments 1 to 39, wherein the support layer 12 or the molded support layer 12' represents about 50% or more (or any value between about 50% and about 97%, including 50% and 97%, in increments of 0.1%, for example, 67.4%, or any range of values between 50% and 97%, including 50% and 97%, in increments of 0.1%, for example, from about 50.0% to about 65.7%) of an overall thickness of the composite stair component 10.

41. The composite stair component 10 of any one of embodiments 1 to 15 and 33 to 40, further comprising: one or more mitered cuts 15 within and through the support layer 12.

42. The composite stair component 10 of embodiment 41, wherein each of the one or more mitered cuts 15 extends through the support layer 12 but not the decorative finish layer 11 or the hinge layer 13.

43. The composite stair component 10 of embodiment 41 or 42, wherein each of the one or more mitered cuts 15 independently has an upside-down "V" shape, an upside-down truncated "V" shape, or an upside-down "V" shape with a circular cut-out at an apex of the upside-down "V" shape.

44. The composite stair component 10 of any one of embodiments 41 to 43, wherein opposing cut surfaces 27a and 27b of each of the one or more mitered cuts 15 comprises one or more surface features (not shown) that enable the opposing cut surfaces 27a and 27b of a given mitered cut 15 to attach to one another.

45. The composite stair component 10 of embodiment 44, wherein the one or more surface features (not shown) comprise hook and loop material, adhesive, a mechanical locking mechanism (e.g., a snap, an interlocking shape thereon).

Prefabricated Stair Tread Finish Systems

46. A stair finish system 20 comprising the composite stair component 10 of any one of embodiments 1 to 45.
47. The stair finish system 20 of embodiment 46, wherein the stair finish system 20 comprises at least two interconnected composite components 17 and 18, each composite component 17/18 comprising the composite stair component 10 of any one of embodiments 1 to 15 and 33 to 45.
48. The stair finish system 20 of embodiment 46 or 47, wherein the stair finish system 20 comprises at least three interconnected composite components 17, 18 and 19, each composite component 17/18/19 comprising the composite stair component 10 of any one of embodiments 1 to 15 and 33 to 45.
49. The stair finish system 20 of embodiment 48, wherein (i) composite component 17 comprises a tread component 17 applied to a horizontal surface 33 of a tread 30 of a stair 28, (ii) composite component 18 comprises a vertical nose 'facing' component 18 applied to a vertical section of a nose 31 of the stair 28, and (iii) composite component 19 comprises an 'under-nose' facing component 19 applied horizontally to a bottom section 34 of the nose 31. See, for example, FIG. 3B.
50. The stair finish system 20 of any one of embodiments 47 to 49, wherein each component of the at least two interconnected composite components 17 and 18 is connected to an adjacent component via the hinge layer 13.
51. The stair finish system 20 of any one of embodiments 47 to 50, wherein each component of the at least two interconnected composite components 17 and 18 is connected to an adjacent component via the decorative layer 11.
52. The stair finish system 20 of any one of embodiments 47 to 51, wherein each component of the at least two interconnected composite components 17 and 18 is connected to an adjacent component via the protective wear layer 14.
53. The stair finish system 20 of embodiment 46, wherein the stair finish system 20 comprises integrally formed composite components 17' and 18', each integrally formed composite component 17'/18' being component portions 17'/18' of the composite stair component 10 comprising molded support layer 12' of any one of embodiments 1 to 40. See, for example, FIGS. 6A-6B.
54. The stair finish system 20 of embodiment 46 or 53, wherein the stair finish system 20 comprises integrally formed composite components 17', 18' and 19', each integrally formed composite component 17'/18'/19' of the composite stair component 10 comprising molded support layer 12' of any one of embodiments 1 to 40. See, for example, FIGS. 6A-6B.
55. The stair finish system 20 of embodiment 54, wherein (i) integrally formed composite component 17' comprises a tread component 17' applied to a horizontal surface 33 of a tread 30 of a stair 28, (ii) integrally formed composite component 18' comprises a vertical nose 'facing' component 18' applied to a vertical section of a nose 31 of the stair 28, and (iii) integrally formed composite component 19' comprises an 'under-nose' facing component 19' applied horizontally to a bottom section 34 of the nose 31. See, for example, FIG. 8.
56. The stair finish system 20 of any one of embodiments 53 to 55, wherein each integrally formed composite component 17' and 18' is integrally connected to one or more adjacent integrally formed components via the molded support layer 12'.
57. The stair finish system 20 of any one of embodiments 53 to 56, wherein each integrally formed composite component 17' and 18' is integrally connected to one or more adjacent integrally formed components via the decorative layer 11.
58. The stair finish system 20 of any one of embodiments 53 to 57, wherein each integrally formed composite component 17' and 18' is integrally connected to one or more adjacent integrally formed components via the adhesive layer 13'.
59. The stair finish system 20 of any one of embodiments 53 to 59, wherein each integrally formed composite component 17' and 18' is integrally connected to one or more adjacent integrally formed components via the protective wear layer 14.
60. The stair finish system 20 of any one of embodiments 46 to 59, further comprising: an attachment layer 22 along at least a portion of a lower support layer surface 121 of the support layer 12 or the molded support layer 12'; and a removable release liner 24 positioned over the attachment layer 22.
61. The stair finish system 20 of any one of embodiments 46 to 59, further comprising: a backing layer 24 positioned along at least a portion of a lower support layer surface 121 of the support layer 12 or the molded support layer 12'.

Stairs Comprising Prefabricated Stair and Stair Tread Finish Systems

62. A stair 28 comprising: a stair tread 30 comprising stair nose 31; a stair riser 32 extending below said tread 30 and stair nose 31; and the stair finish system 20 of any one of embodiments 29 to 38 at least partially covering one of more of: (i) said tread 30, (ii) said stair nose 31, and (iii) said bottom section 34 of the nose 31.
63. The stair 28 of embodiment 62, wherein the stair finish system 20 at least partially covers (i) said tread 30 and (ii) said stair nose 31.
64. The stair 28 of embodiment 62 or 63, wherein the stair finish system 20 at least partially covers (i) said tread 30, (ii) said stair nose 31, and (iii) said bottom section 34 of the nose 31.

Methods of Making Prefabricated Stair and Stair Tread Finish Systems

65. A method of making the composite stair component 10 of any one of embodiments 1 to 45, said method comprising: combining the decorative finish layer 11, the support layer 12 and the hinge layer 13 with one another so that the hinge layer 13 is positioned between the decorative finish layer 11 and the support layer 12, or assembling the decorative finish layer 11 and the support layer 12 with one another, and molding the decorative finish layer 11 and the support layer 12.
66. The method of embodiment 65, further comprising: forming each of (i) the decorative finish layer 11, (ii) the support layer 12 and (iii) the hinge layer 13 separately prior to said combining step.
67. The method of embodiment 65 or 66, further comprising: adding the protective wear layer 14 onto the decorative finish layer 11.
68. The method of any one of embodiments 65 to 67, further comprising: making one or more mitered cuts 15 within and through the support layer 12.
69. The method of embodiment 68, wherein each of the one or more mitered cuts 15 extends through the support layer 12 but not the decorative finish layer 11 or the hinge layer 13 or the protective wear layer 14, when present.

70. The method of embodiment 68 or 69, further comprising: providing one or more surface features (not shown) on opposing cut surfaces 27a and 27b of each of the one or more mitered cuts 15 so as to enable the opposing cut surfaces 27a and 27b of a given mitered cut 15 to attach to one another.
71. The method of embodiment 70, wherein the one or more surface features (not shown) comprise hook and loop material, adhesive, a mechanical locking mechanism (e.g., a snap, an interlocking shape thereon).
72. The method of any one of embodiments 65 to 67, wherein said method comprises said molding step.
73. The method of any one of embodiments 65 to 67 and 72, wherein said method comprises: assembling the decorative finish layer 11 and the support layer 12 proximate a mold 50; applying pressure and heat onto the assembled decorative finish layer 11 and support layer 12 so as to form the composite profile, the composite profile having a curved profile that matches an inner surface 51 of the mold 50. In some embodiments, mold 50 comprises a heat-contact mold 50, wherein heat is applied to the assembled decorative finish layer 11 and support layer 12 (and any other assembled layer) along inner surface 51 of the mold 50. In these embodiments, pressure may be applied onto an end 110 of the assembled decorative finish layer 11 and support layer 12 (and any other assembled layers) so as to advance the assembled decorative finish layer 11 and support layer 12 (and any other assembled layers) into mold 50 while a profile forming plate 52 positioned relative to mold 50 is substantially stationary during this advancement of the assembled decorative finish layer 11 and support layer 12 (and any other assembled layers). See, FIG. 7A.
74. The method of embodiment 73, wherein said molding step comprises heating the assembled decorative finish layer 11 and support layer 12 (and any other assembled layers) to a temperature of about 200° F. for about 10 to 15 seconds. It should be understood that, depending on the materials used to form the assembled decorative finish layer 11 and support layer 12 (and any other layers present during molding, e.g., adhesive layer 13', etc.), the heating temperature and length of time of heating may vary as needed and desired.
75. The method of any one of embodiments 65 to 67 and 72 to 74, wherein the decorative finish layer 11 comprises a paper-backed wood veneer, and the support layer 12 comprises polyvinyl chloride.
76. The method of embodiment 75, wherein the wood veneer comprises oak.
77. The method of any one of embodiments 65 to 67 and 72 to 76, further comprising: positioning an adhesive layer 13' between the decorative finish layer 11 and the support layer 12 during said assembling step and prior to said molding step.
78. The method of any one of embodiments 65 to 67 and 72 to 77, further comprising: positioning a profile forming plate 52 beneath the assembled decorative finish layer 11 and support layer 12 (and any other assembled layers); and molding the profile forming plate 52 with the assembled decorative finish layer 11 and support layer 12 (and any other assembled layers).
79. The method of any one of embodiments 65 to 67 and 72 to 78, further comprising: allowing the assembled decorative finish layer 11 and support layer 12 (and any other assembled layers) to cool after said molding step.
80. The method of embodiment 78 or 79, further comprising: separating the profile forming plate 52 from the molded composite stair component 10 after said molding step.

Methods of Using Prefabricated Stair and Stair Tread Finish Systems

81. A method of using the composite stair component 10 of any one of embodiments 1 to 45 or the stair finish system 20 of any one of embodiments 46 to 61, said method comprising: attaching the composite stair component 10 of any one of embodiments 1 to 45 or the stair finish system 20 of any one of embodiments 46 to 61 to a horizontal surface 33 of a tread 30 of a stair 28.
82. The method of embodiment 81, wherein said attaching step comprises utilizing one or more of the following between (i) the composite stair component 10 or the stair finish system 20 and (ii) the horizontal surface 33: a liquid adhesive (e.g., PVC Compound), a pressure sensitive adhesive, an industrial strength double-sided tape (e.g., VHB-tape 3M (VHB=Very High Bond)), an industrial hook and loop material, and countersunk screws.
83. The method of embodiment 81 or 82, wherein the composite stair component 10 or the stair finish system 20 at least partially covers one or more of: (i) a stair tread 30, (ii) a stair nose 31, and (iii) a stair riser 32 extending below the tread 30 and the stair nose 31.
84. The method of any one of embodiments 81 to 83, wherein the composite stair component 10 or the stair finish system 20 at least partially covers (i) a stair tread 30, and (ii) a stair nose 31.
85. The method of any one of embodiments 81 to 84, wherein the composite stair component 10 or the stair finish system 20 at least partially covers (i) a stair tread 30, (ii) a stair nose 31, and (iii) a bottom section 34 of the nose 31.
86. The method of any one of embodiments 81 to 85, further comprising: attaching opposing cut surfaces 27a and 27b of each of the one or more mitered cuts 15 to one another via one or more surface features (not shown) so as to form at least one 90° angle within the composite stair component 10 or the stair finish system 20.
87. The method of embodiment 86, wherein the one or more surface features (not shown) comprise hook and loop material, adhesive, a mechanical locking mechanism (e.g., a snap, an interlocking shape thereon).
88. The method of any one of embodiments 81 to 87, further comprising: removing a release liner 24 from the stair finish system 20 prior to said attaching step.

The present invention is further illustrated by the following example, which is not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Prefabricated stair components and stair tread finish systems similar to exemplary prefabricated stair components 10 and stair tread finish systems 20 shown in FIGS. 1-8 were made and utilized in residential and commercial buildings.

In addition, it should be understood that although the above-described prefabricated stair components and stair tread finish systems and methods are described as "comprising" one or more components or steps, the above-described prefabricated stair components and stair tread finish systems and methods may "comprise," "consists of," or "consist essentially of" the above-described prefabricated stair components and stair tread finish systems and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a prefabricated stair component and/or stair tread finish system and/or method that "comprises" a list of elements (e.g., components or steps) is not necessarily limited to only those elements (or components or steps), but may include other elements (or components or steps) not expressly listed or inherent to the prefabricated stair component and/or stair tread finish system and/or method.

As used herein, the transitional phrases "consists of" and "consisting of" exclude any element, step, or component not specified. For example, "consists of" or "consisting of" used in a claim would limit the claim to the components, materials or method steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a prefabricated stair component and/or stair tread finish system and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described prefabricated stair components and/or stair tread finish systems and/or methods may comprise, consist essentially of, or consist of any of the herein-described components, method steps, and/or features, as shown in the figures with or without any feature(s) not shown in the figures. In other words, in some embodiments, the prefabricated stair components and/or stair tread finish systems and/or methods of the present invention do not have any additional features other than those shown in the figures, and such additional features, not shown in the figures, are specifically excluded from the prefabricated stair components and/or stair tread finish systems and/or methods. In other embodiments, the prefabricated stair components and/or stair tread finish systems and/or methods of the present invention do have one or more additional features that are not shown in the figures.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A composite stair component comprising:
    a decorative finish layer comprising wood, textured or non-textured paper, a veneer layer, or any combination thereof;
    a support layer comprising wood, medium density fiberboard (MDF), polyvinyl chloride (PVC), a polymeric material, a composite material, or any combination thereof;
    a composite profile such that the support layer comprises a molded support layer having (i) an upper support layer surface, (i) a lower support layer surface, (iii) an inner support layer edge surface, at least a portion of the inner support layer edge surface being substantially perpendicular to the lower support layer surface, and (iv) a lower support layer portion extending substantially perpendicular to the inner support layer edge surface and substantially parallel with and below the lower support layer surface,
    wherein the lower support layer portion comprises an upper inner support layer surface below the lower support layer surface, and the upper inner support layer surface is a distance d from an upper composite profile surface, and distance d is less than or equal to 1.0 inch (in.).

2. The composite stair component of claim 1, wherein the molded support layer comprises polyvinyl chloride (PVC).

3. The composite stair component of claim 2, wherein the decorative finish layer comprises wood.

4. The composite stair component of claim 2, wherein the decorative finish layer comprises a veneer layer.

5. The composite stair component of claim 2, wherein the decorative finish layer further comprises a resin that coats, impregnates or encompasses the wood, the textured or non-textured paper, or the veneer layer.

6. The composite stair component of claim 1, wherein the molded support layer further comprises an outer support layer front edge surface, wherein (i) the outer support layer front edge surface extends from and is connected to the upper support layer surface, and (ii) at least a portion of the outer support layer edge surface extends below the lower support layer surface.

7. The composite stair component of claim 6, wherein the upper support layer surface and the outer support layer front edge surface form a first curved surface profile.

8. The composite stair component of claim 7, wherein the molded support layer further comprises an outer lowermost support layer edge surface, wherein (i) the outer lowermost support layer edge surface extends from and is connected to the outer support layer front edge surface, and (ii) at least a portion of the outer lowermost support layer edge surface extends below the upper inner support layer surface.

9. The composite stair component of claim 8, wherein the upper support layer surface and the outer support layer front edge surface and the outer lowermost support layer edge surface form a second curved surface profile.

10. A composite stair component comprising:
    a decorative finish layer comprising wood, textured or non-textured paper, a veneer layer, or any combination thereof;

a molded support layer having (i) an upper support layer surface, (ii) a lower support layer surface, (iii) an inner support layer edge surface, at least a portion of the inner support layer edge surface being substantially perpendicular to the lower support layer surface, and (iv) a lower support layer portion extending substantially perpendicular to the inner support layer edge surface and substantially parallel with and below the lower support layer surface, said molded support layer comprising wood, medium density fiberboard (MDF), polyvinyl chloride (PVC), a polymeric material, a composite material, or any combination thereof; and an adhesive layer positioned between the decorative finish layer and the molded support layer, wherein the lower support layer portion comprises an upper inner support layer surface below the lower support layer surface, and the upper inner support layer surface is a distance d from an upper composite profile surface, and distance d is less than or equal to 1.0 inch (in.), and wherein the composite stair component comprises an upper composite profile surface and an outer composite profile front edge surface, and (i) the outer composite profile front edge surface extends from and is connected to the upper composite profile surface, and (ii) at least a portion of the outer composite profile front edge surface extends below the lower support layer surface.

11. The composite stair component of claim 10, wherein the upper composite profile surface and the outer composite profile front edge surface form a third curved surface profile having a nose radius $R_n$, and the nose radius $R_n$ is less than or equal to 0.5 in.

12. The composite stair component of claim 10, wherein the composite stair component further comprises an outer lowermost composite profile edge surface, wherein (i) the outer lowermost composite profile edge surface extends from and is connected to the outer composite profile front edge surface, and (ii) at least a portion of the outer lowermost composite profile edge surface extends below the upper inner support layer surface.

13. The composite stair component of claim 12, wherein the decorative finish layer extends along the upper composite profile surface, the outer composite profile front edge surface, and the outer lowermost composite profile edge surface.

14. The composite stair component of claim 10, further comprising:
a protective surface wear layer over said decorative finish layer, said protective surface wear layer comprising at least one resin or polymeric material.

15. A stair comprising:
a stair tread comprising a stair nose;
a stair riser extending below said stair tread and said stair nose; and
the composite stair component of claim 10 at least partially covering one of more of: (i) said stair tread, (ii) said stair nose, and (iii) a bottom section of the stair nose.

16. A method of making a molded composite stair component, said method comprising:
combining (i) a decorative finish layer comprising wood, textured or non-textured paper, a veneer layer, or any combination thereof, (ii) a support layer comprising wood, medium density fiberboard (MDF), polyvinyl chloride (PVC), a polymeric material, a composite material, or any combination thereof, and (ii) an adhesive layer so that the adhesive layer is positioned between the decorative finish layer and the support layer; and
molding the decorative finish layer, the adhesive layer, and the support layer,
wherein (1) the molded composite stair component comprises a lower support layer portion extending (i) substantially perpendicular to an inner support layer edge surface and (ii) substantially parallel with and below a lower support layer surface, (2) the lower support layer portion comprises an upper inner support layer surface below the lower support layer surface, and the upper inner support layer surface is a distance d from an upper composite profile surface, and distance d is less than or equal to 1.0 inch (in.), and (3) the composite stair component comprises an upper composite profile surface and an outer composite profile front edge surface, and (i) the outer composite profile front edge surface extends from and is connected to the upper composite profile surface, and (ii) at least a portion of the outer composite profile front edge surface extends below the lower support layer surface.

17. A stair comprising:
a stair tread comprising a stair nose;
a stair riser extending below said stair tread and said stair nose; and
the composite stair component of claim 1 at least partially covering one of more of: (i) said stair tread, (ii) said stair nose, and (iii) a bottom section of the stair nose.

18. A method of making the composite stair component of claim 1, said method comprising:
combining (a) the decorative finish layer, and (b) the support layer; and
molding the decorative finish layer and the support layer to form the composite stair component.

19. A stair comprising:
a stair tread comprising a stair nose;
a stair riser extending below said stair tread and said stair nose; and
the composite stair component of claim 3 at least partially covering one of more of: (i) said stair tread, (ii) said stair nose, and (iii) a bottom section of the stair nose.

20. A stair comprising:
a stair tread comprising a stair nose;
a stair riser extending below said stair tread and said stair nose; and
the composite stair component of claim 4 at least partially covering one of more of: (i) said stair tread, (ii) said stair nose, and (iii) a bottom section of the stair nose.

* * * * *